Nov. 7, 1944.                N. F. BARNES                2,362,235
              APPARATUS FOR INDICATING VARIATIONS
                 IN DENSITIES OF TRANSPARENT MEDIA
                      Filed Nov. 10, 1943

Inventor:
Norman F. Barnes,
by Harry E. Dunham
His Attorney.

UNITED STATES PATENT OFFICE 2,362,235

APPARATUS FOR INDICATING VARIATIONS IN DENSITIES OF TRANSPARENT MEDIA

Norman F. Barnes, Schenectady, N. Y., assignor to General Electric Company, a corporation of New York Application November 10, 1943, Serial No. 509,713

3 Claims. (Cl. 35—19)

My invention relates to apparatus by which density variations in a transparent medium may be made visible or photographed, such processes being sometimes referred to as the striation ("schlieren") method. It has for its object the provision of an improved form of such apparatus.

My invention will be better understood from the following description taken in connection with the accompanying drawing and its scope will be pointed out in the appended claims.

Figure 1:
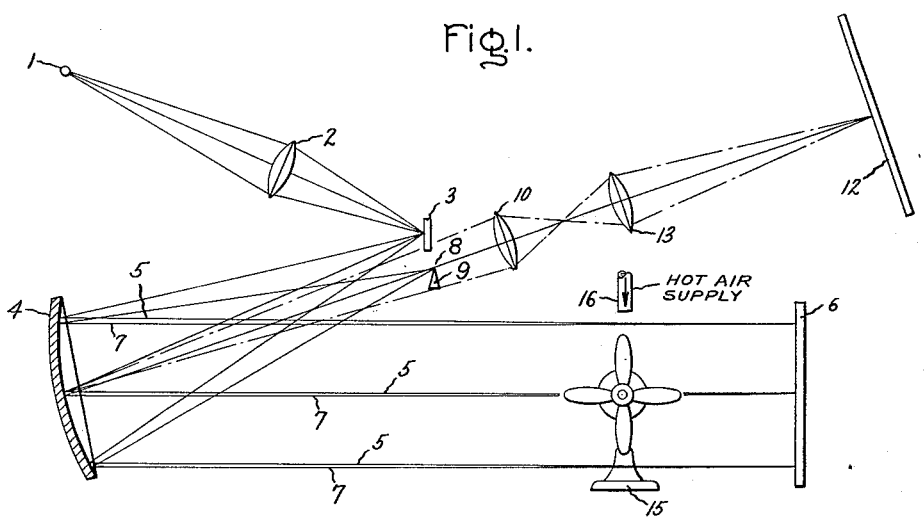
Figure 2:
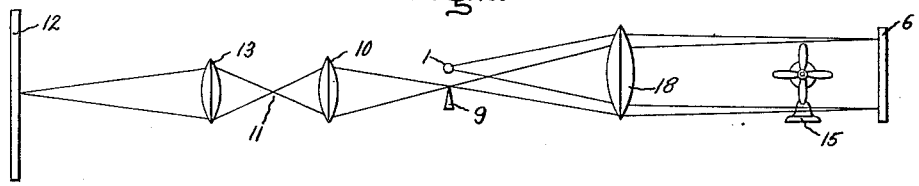
Figure 3:
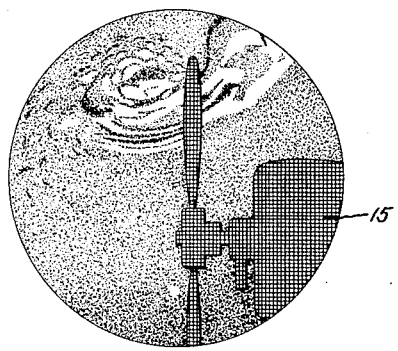
Figure 4:
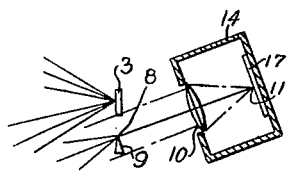

Referring to the drawing, Fig. 1 is a diagram illustrating one embodiment of my invention; Fig. 2 is a diagram illustrating a modification; Fig. 3 illustrates a visible representation which may be obtained with my invention; and Fig. 4 illustrates a modification.

In Fig. 1 the light source 1 is focussed by the lens 2 on the first surface flat mirror 3, the image becoming in effect a light source. Light forming the image at that point is reflected on the first surface concave parabolic mirror 4 from which it is reflected in a beam of parallel rays 5 directed toward the first surface flat mirror 6. This mirror is positioned with its front reflecting surface nearly perpendicular to the incident rays 5 but departing from exact perpendicularity thereto just enough to cause the reflected rays 7 to make a very small angle with the incident rays. Because of this angle the rays 7 after being again reflected by the parabolic mirror are refocussed to form another image of the light source at the point 8 which is slightly displaced from the first-mentioned focal point on the mirror 3. The knife edge 9 is positioned at the point 8 and light which passes that edge is focussed by the lens 10 to form an image at 11 of an object 15 placed in front of the flat mirror 6. The dot-and-dash lines drawn from the lens 10 to the mirror 4 and to the image 11 conventionally indicate the position of the lens 10 relative to other parts such as the mirror 4 and the image 11. One may obtain a magnified image of the light source on the screen 12 by using another lens 13. As shown in Fig. 4, the lens 10, if desired, may comprise the lens of a camera 14, the photographic film 17 on which the image is recorded being located at the focal point 11.

If the knife edge is so adjusted that none of the light reflected by the several mirrors passes it no image will appear at the point 11 or on the screen 12. However, if there is introduced in the region in front of the flat mirror 6 air of either greater or less density than that for which the apparatus was adjusted some of the light by reason of its being refracted a greater or less extent by such air will pass over the knife edge and be effective in producing an image in the camera or on the screen. Such a change in density of the air in front of the flat mirror 6 may be the result of changes in temperature of the air or of changes in the pressure thereof.

A similar variation in refraction of the light can be produced by a transparent medium, such as glass, whose surfaces are not plane and parallel, such a variation producing a corresponding change of the image at 11 or on the screen 12.

In Fig. 1 I have illustrated one use to which this apparatus may be put which is to give a visible representation of the path of the air, the whirls and vortices, in the vicinity of the blades of a rotating fan. Positioned near the mirror 6 and in the path of the rays incident to and reflected by it is shown the electric fan 15 with its axis of rotation perpendicular to the path of the rays. If the knife edge is adjusted so as to allow a small amount of the light of the system normally to pass it that light will form a background on the camera film or on the screen 12 upon which the fan will be silhouetted as illustrated by Fig. 3. Now if a stream of hot air be introduced behind the fan blades, as for example by the pipe 16, the path of that air will also appear on the camera film or on the screen in the form of light and dark streaks as shown by Fig. 3. The hot air being less dense than the surrounding air has a lower index of refraction. The same effect may be seen if the variation in the air stream is a pressure variation rather than a temperature variation such being well illustrated around the buckets of a turbine whose nozzles are supplied with compressed air.

In certain cases I may prefer to employ a lens in lieu of the parabolic mirror. Such an arrangement is illustrated by Fig. 2 where the convex lens 18 directs the light from the source 1 on the flat mirror 6 and after reflection therefrom focuses it at the knife edge 9. Beyond the latter are the lenses 10 and 13 and the screen 12 just as in the form shown by Fig. 1.

What I claim as new and desire to secure by Letters Patent of the United States, is:

1. Apparatus adapted to be arranged in a transparent gaseous medium, for rendering visible pressure variations in said medium comprising a source of light, means for deflecting light therefrom in a beam of substantially parallel rays, means spaced from said first mentioned means for reflecting said rays back thereto, light obstructing means having an edge arranged at the focal point of the light again deflected by said first mentioned means, and means arranged beyond said obstructing means for producing an image of said first mentioned means, said light deflecting means being arranged with its axis making an acute angle with said parallel rays whereby the presence of any shadow forming apparatus in the path of said parallel rays is avoided.

2. Apparatus adapted to be arranged in a transparent gaseous medium, for rendering visible pressure variations in said medium comprising a parabolic mirror, a light source arranged at a focal point thereof, a flat mirror spaced from said parabolic mirror for reflecting back thereto light received therefrom, light obstructing means having an edge arranged at the focal point of the light reflected back by said mirror and re-reflected by said parabolic mirror, and a lens arranged beyond said edge for producing an image of said parabolic mirror, said parabolic mirror being arranged with its axis making an acute angle with the beam of light reflected thereby whereby the presence of any shadow forming apparatus in said light beam is avoided.

3. Apparatus adapted to be arranged in a transparent gaseous medium, for rendering visible pressure variations in said medium comprising a source of light, means for deflecting light therefrom in a beam of substantially parallel rays, means spaced from said first mentioned means for reflecting said rays back thereto, the path of the reflected rays making a small angle with the path of the incident rays whereby the reflected rays are deflected to a focal point displaced from said source, a light obstructing member having an edge at said point and a lens arranged in the path of the light passing said edge and beyond the same to produce an image of said light deflecting means, said light deflecting means being arranged with its axis making an acute angle with said parallel rays whereby the presence of any shadow forming apparatus in the path of said parallel rays is avoided.

NORMAN F. BARNES.